UNITED STATES PATENT OFFICE.

SAMUEL CABOT, OF CANTON, MASSACHUSETTS, ASSIGNOR TO SAMUEL CABOT, INC., OF BOSTON, MASSACHUSETTS, A CORPORATION OF MASSACHUSETTS.

WATERPROOF CEMENT.

1,305,645.     Specification of Letters Patent.     Patented June 3, 1919.

No Drawing.     Application filed February 26, 1916. Serial No. 80,600.

*To all whom it may concern:*

Be it known that I, SAMUEL CABOT, a citizen of the United States, residing at Canton, county of Norfolk, Commonwealth of Massachusetts, have invented certain new and useful Improvements in Waterproof Cement, of which the following is a specification.

The object of my invention is to provide a waterproof and impermeable cement, mortar, plaster, or the like.

The invention resides in the process of effecting a waterproof composition by the association with Portland or other cement, of a chemically inert, powdered, air adsorbent matter, such as a pulverizable pitch of coal tar or other origin. The invention consists further in the product of the process.

The pitch here contemplated to be mixed with the cement may be of various derivations, as from coal tar, blast furnace tar, coke-oven tar, water-gas or oil-gas tar, or powdered asphalt, petroleum asphalt or petroleum pitch, or other hard pulverizable bituminous product.

The above mentioned products are inert having no chemical effect upon cement whether of an acid or alkaline nature, nor do the cements have any effect on them. These products being chemically inert tend also to protect the cement against acid or alkaline fumes or liquids. Physically being hard, and the particles of a sharp angular structure they tend to strengthen the cements, mortars, etc.

The bituminous particles derive their waterproofing properties from:

1. Their impermeability to moisture.
2. Their property of adsorbing air. This second property comes into play when the water of the cement, concrete, mortar, etc., mixture has evaporated and air has taken its place. An envelop of air is formed around the particles of the waterproofing compound, thus creating a pneumatic casing tending to prevent water from entering or permeating.

The ground waterproofing material may be added direct to the dry cement in powdered form, or it may be added to the wet mixture, or it may be compounded with hydrated lime or clay or other fine powder before addition to the cement, etc. Again the waterproofing material may be compounded into a paste form with water by grinding it to remove the adsorbed air, or it may be more readily compounded with water by the addition of some colloid such as dextrin, soap, etc., which being more readily adsorbed than the air replaces it.

As an example of a waterproof cement made according to the above description I take coal tar pitch of a melting point of approximately 212° F., grind it in any suitable type of grinding mill to a fineness so that the particles will pass through a 100 mesh screen. Three parts of this ground pitch I mix thoroughly with 97 parts of dry Portland cement. The resulting composition may be used as a waterproof cement by mixing it with the usual amount of water either with or without the addition of sand and gravel. I do not limit myself to the use of coal tar pitch, but may use any of the above mentioned products, nor do I limit the melting point of this pitch, as it may vary, from the lowest point that may be readily ground to the desired fineness, to a compound approaching a coke. I also do not limit myself to Portland cement but may use any of the usual cements, mortars, stuccoes or plasters that are known to the building trade.

To manufacture a compound powder which may be used under the above described processes for producing waterproof cement, I mix 50 parts of the above mentioned powdered bituminous material with 50 parts more or less of slaked lime or clay.

To manufacure the paste, I grind 50 parts of pitch with 50 parts more or less of water in a suitable pug mill with or without the addition of varying amounts of colloidal substances such as dextrin or some suitable soap.

The cement may be mixed on the spot from all of the ingredients above specified, or for the convenience of commerce as a powder or a paste. The form of the materials may be varied and the proportions and ingredients may be varied all without departing from the spirit of my invention if within the limits of the appended claims.

What I therefore claim and desire to secure by Letters Patent is:

1. A composition of matter for waterproofing cement consisting of a paste formed of powdered pitch moistened with water with the aid of a trace of soap.

2. That method of producing waterproof concrete which consists of mixing with cement a powdered, chemically inert air adsorptive substance in a substantially air-free state which will adsorb after mixture and which will hold a film of air to prevent water permeating the dried set concrete.

3. That method of producing waterproof concrete which consists of mixing with cement a paste of equal parts of water and powdered pitch.

4. The method consisting of mixing cement with a paste of powdered pitch and water, with a trace of soap to facilitate the mixing.

5. A composition comprising cement and powdered pitch.

6. A composition in paste form to be used in producing waterproof cement consisting of powdered chemically inert, air adsorptive matter and water in equal parts.

7. A composition in paste form to be used in producing waterproof cement consisting of powdered pitch and water and a protective colloid.

8. The composition to produce waterproof concrete, comprising cement through which is evenly distributed an air adsorptive substance whereby a pneumatic resistant distributed throughout the interstices of the concrete, is maintained to frictionally resist the entrance of moisture after the concrete has set and dried.

9. A waterproof concrete consisting of a cement mixture and a pneumatic resistant distributed in the interstices of the dried concrete and held in water resisting relation by adsorption of a component of the mixture.

10. A composition in paste form to be used in producing waterproof cement consisting of powdered pitch brought into paste form in water by means of a protective colloid.

11. A composition in paste form to be used in producing waterproof cement consisting of powdered pitch brought into paste form in water by means of a wetting agent.

12. A method of making waterproof cement consisting in mixing with the cement a paste formed of powdered pitch, a wetting agent and water.

13. A waterproof cement consisting of a cement mixture and a pitch paste consisting of powdered pitch, a wetting agent and water.

In testimony whereof I affix my signature in presence of two witnesses.

SAMUEL CABOT.

Witnesses:
VICTORIA LOWDEN,
M. P. WOTHERSPOON.